Patented May 3, 1938

2,116,438

UNITED STATES PATENT OFFICE 2,116,438

DEGREASING SOLVENT

Arthur A. Levine, Niagara Falls, N. Y., assignor to E. I. du Pont de Nemours & Company, Wilmington, Del., a corporation of Delaware No Drawing. Application May 22, 1935, Serial No. 22,817

4 Claims. (Cl. 87—5)

This invention relates to a novel degreasing process and to a novel solvent employed in that process. More particularly, it is concerned with a method of cleaning metallic articles and surfaces with the novel chlorinated hydrocarbon solvent 1,1,2-trichlorpropene-1 in order to remove grease and other impurities therefrom.

Various solvents have been previously disclosed as suitable for use in the degreasing of metallic surfaces and objects. Commercially, various metallic parts are degreased or freed from greasy or oily impurities before subsequent operations such as fabricating or plating. Especially during machining operations, many metallic parts become coated with objectionable deposits. Among the solvents now in use or which have been suggested for use may be mentioned the chlorinated hydrocarbons, carbon tetrachloride and trichlorethylene, and various petroleum fractions such as naphtha. In my co-pending application Ser. No. 9,911, filed March 7, 1935 I have disclosed various other solvents which have been found suitable for use in degreasing processes.

Experience has indicated that the halogenated hydrocarbon solvents, more particularly the chlorinated hydrocarbons are most suitable for use in metal degreasing. A liquid intended for use in the degreasing of metal parts in commercial degreasing machines must ordinarily be stable so that undue decomposition does not develop even with continuous daily use of the solvent in the degreasing equipment. Moreover, it must have high solvent power for grease and must not have too high a boiling point, so that it may be readily purified by distillation and condensation. Above all, it must be uninflammable or substantially uninflammable because a solvent which forms inflammable or explosive vapors is a constant hazard in industrial operations.

A boiling point somewhat above 100° C. but below about 130° C. is also preferable. If the solvent is too volatile, losses will occur in operation. Moreover the air surrounding the degreasing equipment will be filled with vapors of the solvent and this is objectionable for several reasons. Many solvents possess some physiological action which is experienced by the men operating the degreasing equipment when they breathe the air filled with the vapors of the solvent. Moreover the escape of vapors into the air in large amount may prevent workmen from working in the same room. For these reasons a boiling point above 100° C., with consequent lower volatility, is preferred.

As previously mentioned, the chlorinated hydrocarbons have been most extensively used in commercial operations for metal degreasing and they most adequately answer the requirements for a suitable solvent in regard to stability, noninflammability and relatively low volatility. However, many of the solvents now used, such as trichlorethylene, and carbon tetrachloride are not as satisfactory as might be desired. After examination of many solvents I have found the unsaturated chlorinated hydrocarbon 1,1,2-trichlorpropene-1 most suitable for use in the commercial degreasing of metallic parts and surfaces.

This compound, which may be represented by the structural formula $CH_3.CCl=CCl_2$, has an atmospheric boiling point of about 118° C. and is very stable, even when exposed at high temperatures to the action of water. In use, it does not readily develop appreciable amounts of acid. The development of acidity, which attacks the equipment is a serious disadvantage of certain solvents now in commercial use.

1,1,2-trichlorpropene-1 possesses high solvent action for greasy impurities and its boiling point falls within the temperature range found most suitable. Due to its relatively low volatility the solvent losses are not appreciable. Moreover, its physiological action is much less than some of the other chlorhydrocarbons and from this viewpoint it is also more advantageous as a degreasing solvent.

The solvent, 1,1,2-trichlorpropene-1, may be used in any of the types of degreasing machines now in common commercial use, such as the one-dip machine, the two-dip machine or the three-dip machine. It may also be used in machines employing solvent rinse steps, in which the article to be degreased is immersed in the vapors of the solvent and the condensation occurring on the article washes off adhering dirt. Or, it may be used with equal success in any machine utilizing two or more of these steps, such as the familiar type in which the immersion in liquid step is followed by an after-treatment comprising a vapor rinse.

If desired, the chlorinated unsaturated hydrocarbon which I propose using in degreasing operations may be employed in admixture with one or more additional solvents. Thus, it is possible to mix 1,1,2-trichlorpropene-1 in various proportions with a hydrocarbon such as naphtha or with a chlorhydrocarbon such as trichlorethylene or carbon tetrachloride. Perchlorethylene, having a boiling point of 120° C., is a most desirable compound to employ in admixture with the novel solvent because its boiling point is so close to that of 1,1,2-trichlorpropene-1. Mixtures of perchlorethylene-1,1,2-trichlorpropene-1, in which the perchlorethylene content ranges up to 50% or more will be found most satisfactory and will possess a uniform boiling point around 118° C.

As examples of my novel process for degreasing metallic parts, utilizing the novel solvent 1,1,2-trichlorpropene-1, the following may be given:—

Example 1

A bath of 1,1,2-trichlorpropene-1

$$CH_3.CCl=CCl_2,$$

was utilized at a temperature of about 60° C. for the degreasing of iron objects which were subsequently to be nickel plated. The metal articles were dipped in the solvent and then permitted to dry by evaporation in the air. Although there had been a great deal of greasy dirt on the objects before they were immersed, it was found that they were completely clean after the treatment.

Example 2

In this example the 1,1,2-trichlorpropene-1 was used in the vapor state in a commercial machine utilizing a vapor rinse step. A bath of warm solvent vapor was maintained and the iron articles to be degreased were placed in the bath of the vapor. Condensation took place on the articles and the condensate washed off the greasy impurities present thereon. The cleaning operation was entirely successful and the parts could be plated without any subsequent treatment.

Example 3

A solvent mixture comprising 60% 1,1,2-trichlorpropene-1 and 40% perchlorethylene was used in a commercial machine having a liquid immersion step followed by a vapor rinse step. Small metal parts were cleaned and then permitted to dry in the open air. The parts were completely clean and could be nickel-plated immediately.

Example 4

A solvent mixture comprising 80% of 1,1,2-trichlorpropene-1 and 20% of trichlorethylene was used in the machine of Example 3. Steel automobile parts were effectively cleaned.

The following solvent mixtures were also used in the same equipment:

| | Per cent |
|---|---|
| 1,1,2-trichlorpropene-1 and 70% trichlorethylene | 30 |
| 1,1,2-trichlorpropene-1 and 70% perchlorethylene | 30 |
| 1,1,2-trichlorpropene-1 and 50% perchlorethylene | 50 |
| 1,1,2-trichlorpropene-1 and 70% carbon tetrachloride | 30 |
| 1,1,2-trichlorpropene-1 and 20% carbon tetrachloride | 80 |

In all cases the steel parts were completely cleaned and could be plated without any subsequent cleaning operations.

The various details given in the preceding examples are to be considered as illustrative and not as restrictive. The scope of the invention is to be construed in accordance with the appended claims.

I claim:

1. A new solvent for use in the degreasing of metal objects which comprises 1,1,2-trichlorpropene-1 in admixture with a chlorinated hydrocarbon selected from the group which consists of carbon tetrachloride, trichlorethylene and perchlorethylene.

2. A new solvent for use in the degreasing of metal objects which comprises 1,1,2-trichlorpropene-1 and perchlorethylene.

3. A new solvent for use in the degreasing of metal objects which comprises 1,1,2-trichlorpropene-1 and trichlorethylene.

4. A new solvent for use in the degreasing of metal objects which comprises 1,1,2-trichlorpropene-1 and carbon tetrachloride.

ARTHUR A. LEVINE.